(12) United States Patent
Watson

(10) Patent No.: US 7,082,891 B2
(45) Date of Patent: Aug. 1, 2006

(54) FOOD PRODUCT FLAVORING APPARATUS

(76) Inventor: Travis L. Watson, 6611 W. Peoria Ave., Glendale, AZ (US) 85302

( * ) Notice: Subject to any disclaimer, the term of this patent is extended or adjusted under 35 U.S.C. 154(b) by 0 days.

(21) Appl. No.: 10/979,578

(22) Filed: Nov. 1, 2004

(65) Prior Publication Data

US 2006/0090696 A1     May 4, 2006

(51) Int. Cl.
*B05C 5/00* (2006.01)
*B05B 7/06* (2006.01)
*A23L 1/18* (2006.01)

(52) U.S. Cl. .......................... 118/24; 118/19; 118/300; 118/313; 99/323.8; 222/368

(58) Field of Classification Search .................. 118/19, 118/24, 25, 13, 300, 313; 99/323.8; 426/289, 426/293; 222/231, 233, 460, 462, 367, 368
See application file for complete search history.

(56) References Cited

U.S. PATENT DOCUMENTS

| | | | | |
|---|---|---|---|---|
| 2,245,488 A | * | 6/1941 | Marcuse | 222/233 |
| 2,939,379 A | * | 6/1960 | Schmitt | 99/323.8 |
| 3,029,751 A | * | 4/1962 | Gilmore | 426/294 |
| 3,557,718 A | * | 1/1971 | Chivers | 426/290 |
| 3,716,020 A | * | 2/1973 | De Wit et al. | 118/303 |
| 3,722,399 A | | 3/1973 | Cole | |
| 3,774,523 A | | 11/1973 | Moot | |
| 3,783,820 A | | 1/1974 | Hautly et al. | |
| RE27,920 E | | 2/1974 | Cole | |
| 4,067,292 A | | 1/1978 | Friedman et al. | |
| 4,166,208 A | | 8/1979 | Martel et al. | |
| 4,477,023 A | | 10/1984 | Gates | |
| 4,512,247 A | | 4/1985 | Friedman | |
| 4,996,911 A | | 3/1991 | Sherman | |
| 5,065,927 A | | 11/1991 | Wahl et al. | |
| 5,520,942 A | | 5/1996 | Sauer, Jr. et al. | |
| 5,690,979 A | | 11/1997 | Bourns et al. | |
| 5,721,012 A | | 2/1998 | Long, Jr. et al. | |
| 5,771,779 A | * | 6/1998 | Stein et al. | 99/323.7 |
| 6,056,822 A | | 5/2000 | Jefferson et al. | |
| 6,592,920 B1 | | 7/2003 | Charles et al. | |
| 6,949,141 B1 | * | 9/2005 | Huttlin | 118/303 |
| 2003/0113420 A1 | * | 6/2003 | Martin et al. | 426/289 |

OTHER PUBLICATIONS

"Counter Top Dispenser" Pop's E-Z Popcorn & Supply Co. http://www.popsezpopcorn.com/product.asp?Product_Id=20192&d_Id=5948&11=5948&12=. Apr. 7, 2004.

"BIB Topper Dispensing System" Pop's E-Z Popcorn & Supply Co. http://www.popsexpopcorn.com/product.asp?Product_Id=20193&d_Id=5948&11=5948&12=, Apr. 7, 2004.

* cited by examiner

*Primary Examiner*—Chris Fiorilla
*Assistant Examiner*—Yewebdar Tadesse
(74) *Attorney, Agent, or Firm*—Meschkow & Gresham, PLC

(57) ABSTRACT

A food product flavoring apparatus (20) includes a receptacle (22) having a dispensing base (30), nozzles (50) positioned above the dispensing base (30), and a vessel (80) holding a liquid flavoring (82). The liquid flavoring (82) is delivered from the vessel (80) to the nozzles (50) via a conduit (84) and a pump (86). The liquid flavoring (82) is sprayed from the nozzles (50) and uniformly covers a food product, such as popcorn (40), lying on the dispensing base (30). Following application of the liquid flavoring (82), vanes (60) of the dispensing base (30) are adjusted such that the flavored popcorn (45) is released through the dispensing base (30). The popcorn (45) is subsequently funneled through a hopper (32) positioned below the dispensing base (30) and into a container (36).

14 Claims, 3 Drawing Sheets

FOOD PRODUCT FLAVORING APPARATUS

TECHNICAL FIELD OF THE INVENTION

The present invention relates to the field of devices for flavoring food products. More specifically, the present invention relates to devices for dispensing liquid flavoring onto popcorn.

BACKGROUND OF THE INVENTION

Americans consume roughly seventeen billion quarts of popped popcorn annually or about fifty-nine quarts per man, woman and child. A significant percentage of that popcorn is eaten in theaters, stadiums, and other places of public entertainment. Many consumers especially enjoy melted butter, oil-based butter flavorings, and other liquid flavorings applied to their popcorn. Typically, molten liquid flavoring is poured over individual bags or boxes of popcorn from an automatic butter warmer and dispenser at time of sale by the concessionaire. More frequently, self-service pump systems are being provided for enabling a customer to dispense melted butter or another such flavoring to his or her own popcorn. Thus, a customer may apply a desired quantity of butter onto the popcorn.

Unfortunately, pouring melted butter or the like over popcorn leaves only a portion of the kernels buttered. That is, the top portion of the bag or box of popcorn may be laden with molten butter, while the bottom portion of the popcorn may be completely without butter. Such a situation is undesirable in that the saturated popcorn kernels become soggy, while the dry popcorn kernels are absent the appealing flavor of the butter, for which the customer may pay extra to obtain. In addition, the customer often gets his or her fingers thoroughly coated with butter when eating the butter saturated popcorn kernels.

Yet another problem with the pump-style butter dispensers is that the butter can splatter onto the floor behind the counter where the concessionaire is working, or worse, the butter can splatter onto the floor at the self-service station when the butter is dispensed by multiple customers frequenting such a station. The spilled butter and oil-based butter flavorings cause the floor around these dispensers to get very slippery, thus creating a hazardous situation for the concessionaire and/or customer.

Attempts have been made to alleviate the shortcomings of the conventional pump-style butter dispenser through the application of a mist of butter or butter flavoring onto the popcorn. For example, one prior art device, operable by a concessionaire, includes a hopper for popcorn. An operator opens a large bag of pre-popped popcorn at the bottom and places it into the hopper. This bag of pre-popped popcorn can thus be utilized to fill multiple individual containers. The popcorn is warmed by a heating lamp, and the popcorn is dispensed through an opening at the bottom of the hopper. As the popcorn is dispensed through the opening, a spray nozzle closely adjacent the opening sprays a mist of molten butter or other flavoring onto the falling popcorn.

While such a device may more uniformly apply butter or butter flavoring onto popcorn than prior art pump-style butter dispensers, it still suffers from problems associated with non-uniformity of butter application. In particular, the popcorn passing closest to the spray nozzle may be more thickly coated, while blocking the mist to the more distant kernels, thus producing a non-uniform distribution of flavoring. In addition, the device is configured for operation by the concessionaire, and since it is utilized to dispense multiple containers of popcorn, the popcorn can only be treated with a single, non-variant application of flavoring. As such, this prior art device cannot be utilized at a self-service station of a business establishment. Nor can the customer control the quantity of butter to be applied to his or her own popcorn.

Accordingly, what is needed is an apparatus for enabling a customer to uniformly apply a desired quantity of flavoring to a food product such as popcorn.

SUMMARY OF THE INVENTION

Accordingly, it is an advantage of the present invention that an apparatus for applying liquid flavoring to a food product is provided.

It is another advantage of the present invention that an apparatus is provided for dispensing a uniform mist of liquid flavoring to a food product.

Another advantage of the present invention is that an apparatus is provided that is easily operated and can be utilized by a customer at a self-service station of a public venue.

Yet another advantage of the present invention is that an apparatus is provided that enables a customer to apply a desired quantity of butter or liquid flavoring onto his or her own container of popcorn.

The above and other advantages of the present invention are carried out in one form by a food product flavoring apparatus that includes a receptacle having a dispensing base for selectively holding the food product. A nozzle is positioned above the dispensing base, and a vessel is in fluid communication with the nozzle for holding a fluid flavoring. The apparatus further includes means, in communication with the vessel for delivering the liquid flavoring to the nozzle and spraying the liquid flavoring from the nozzle to uniformly cover the food product.

The above and other advantages of the present invention are carried out in another form by a food product flavoring apparatus that includes a receptacle having a dispensing base for selectively holding the food product, the dispensing base including moveable vanes. Multiple nozzles are distributed above the dispensing tray, and a vessel is in fluid communication with the multiple nozzles for holding a liquid flavoring. The apparatus further includes means, in communication with the vessel, for delivering the liquid flavoring to the multiple nozzles and for spraying the liquid flavoring from the multiple nozzles. The multiple nozzles are configured to cause the liquid flavoring sprayed from the multiple nozzles to uniformly cover a surface area of the dispensing tray. The apparatus further includes means for adjusting the vanes to enable a release of the food product through the dispensing base.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
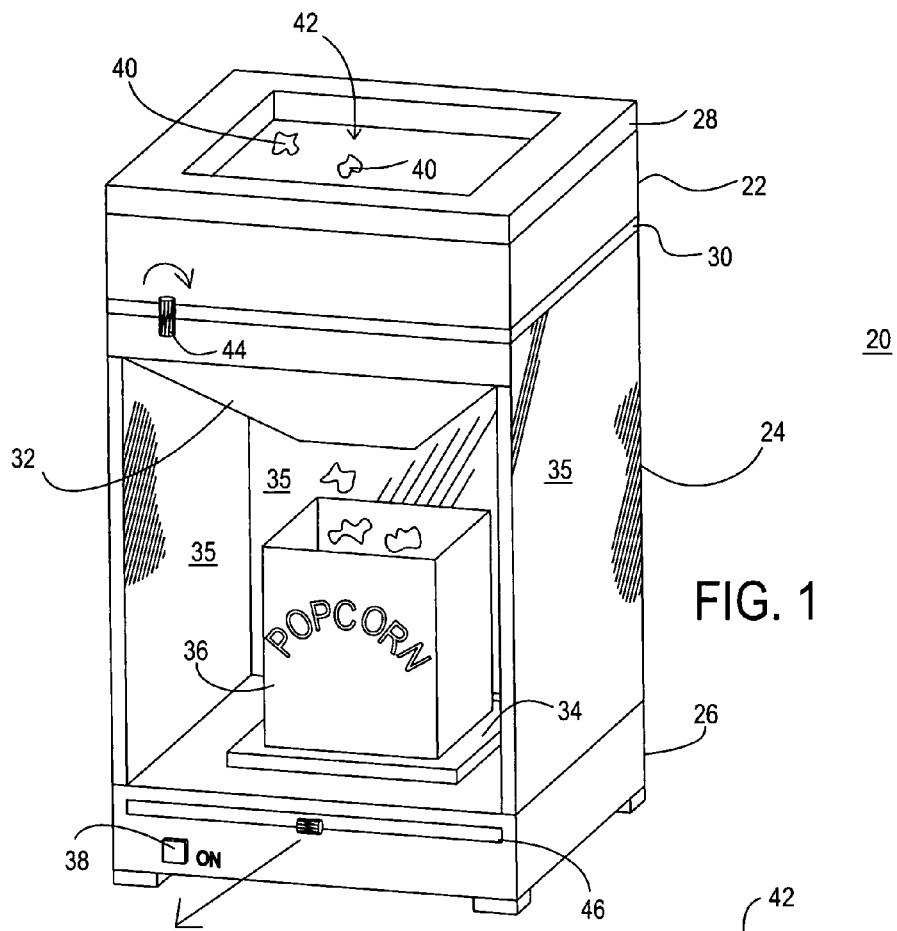
FIG. 1 shows a perspective view of a food product flavoring apparatus in accordance with a preferred embodiment of the present invention.

FIG. 1 shows a perspective view of a food product flavoring apparatus 20 in accordance with a preferred embodiment of the present invention. In a preferred embodiment, food product flavoring apparatus 20 is utilized by a patron at a self-service station of a business establishment. In particular, apparatus 20 may be utilized to apply a liquid topping, such butter, butter flavoring, or other such liquid flavoring to "plain" popcorn in a uniform manner to yield "flavored" popcorn.

As is well known to those skilled in the art, popcorn is a variety of corn whose kernels burst open and puff out when heat is applied to it. The popcorn referred to herein is "popped" popcorn, i.e., popcorn that has already been heated and has burst open and puffed out. The term "plain" referred to herein distinguishes popcorn that has not yet been treated with butter, butter flavoring, and any other such liquid flavoring, while the term "flavored" distinguishes the popcorn that has been topped with a liquid flavoring.

Food product flavoring apparatus 20 includes an enclosed receptacle 22, an intermediate section 24, and a base 26 upon which intermediate section 24 is mounted. A liquid flavoring delivery unit 28 is positioned above and is coupled to a top of receptacle 22, and a dispensing base 30 defines a bottom of receptacle 22. A hopper 32 is positioned in intermediate section 24 below dispensing base 30, and a platform 34 resides in intermediate section 24 upon which a popcorn container 36 may be placed. Walls 35 extend between dispensing base 30 and base 26 in intermediate section 24. In a preferred embodiment, walls 35 surround three sides of intermediate section 24, with the front, customer-facing side of apparatus 20 having no wall. A liquid flavoring dispensing button 38 is located in base 26.

In general, a user pours plain popcorn 40 from a container, such as popcorn container 36, through a central opening 42 in liquid flavoring delivery unit 28. Plain popcorn 40 comes to rest on dispensing base 30 within receptacle 22. The user then places his or her empty popcorn container 36 onto platform 34, and activates liquid flavoring dispensing button 38. When a user activates apparatus 20 by depressing dispensing button 38, liquid flavoring (discussed below) is sprayed from one or more nozzles (discussed below) in liquid flavoring delivery unit 28 onto plain popcorn 40 residing on dispensing base 30. In an exemplary embodiment, the duration of the dispensing activity is a predetermined time interval controlled by a timing unit (not shown) of apparatus 20. A customer may then repeat this activity until the desired quantity of liquid flavoring is applied to plain popcorn 40. Alternatively, the duration of the dispensing activity may be controlled manually by the user. For example, the user may deactivate apparatus 20 by depressing dispensing button 38.

Next, the user actuates dispensing base 30 via a handle 44. Flavored popcorn 45 (formerly, plain popcorn 40) falls from dispensing base 30, is channeled through hopper 32, and falls into popcorn container 36. A waste collection tray 46 residing below platform 34, and slidably removable from base 26, catches any popcorn or liquid flavoring that does not fall into popcorn container 36 for easy clean up.

Figure 2:
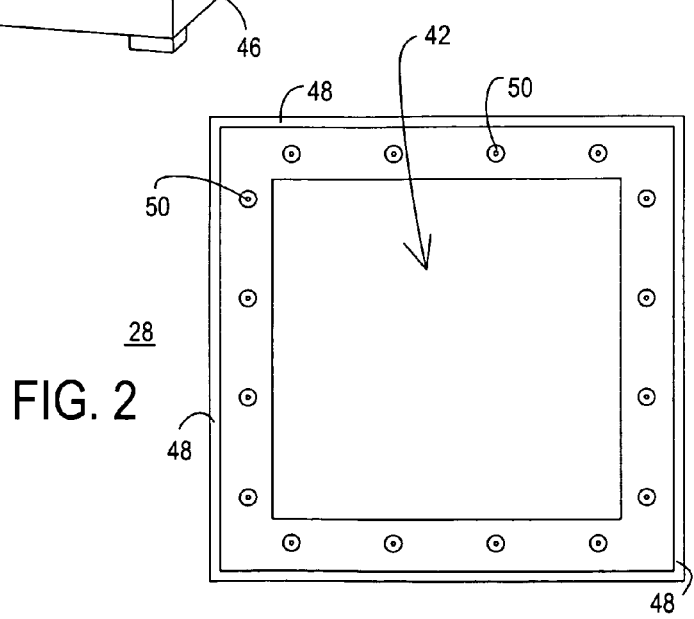
FIG. 2 shows a bottom view of a liquid flavoring dispensing unit of the apparatus of FIG. 1.

Referring to FIG. 2 in connection with FIG. 1, FIG. 2 shows a bottom view of liquid flavoring dispensing unit 28 of apparatus 20. Liquid flavoring dispensing unit 28 is a frame-like structure having central opening 42. A rimmed edge 48 of unit 28 interfaces with receptacle 22, and multiple nozzles 50 are uniformly distributed about liquid flavoring dispensing unit 28. Nozzles 50 are of a type suitable for dispensing a fine mist of a viscous liquid, such as those in use in food processing applications for dispensing oil, syrup, wax, and the like. Such nozzles apply precise amounts of coating and are resistant to clogging. When liquid flavoring dispensing unit 28 is situated on receptacle 22, nozzles 50 face downwardly toward dispensing base 30. Nozzles 50 provide an appropriate spray radius that causes the liquid flavoring sprayed from nozzles 50 to uniformly cover the surface area of dispensing tray 30.

Figure 3:
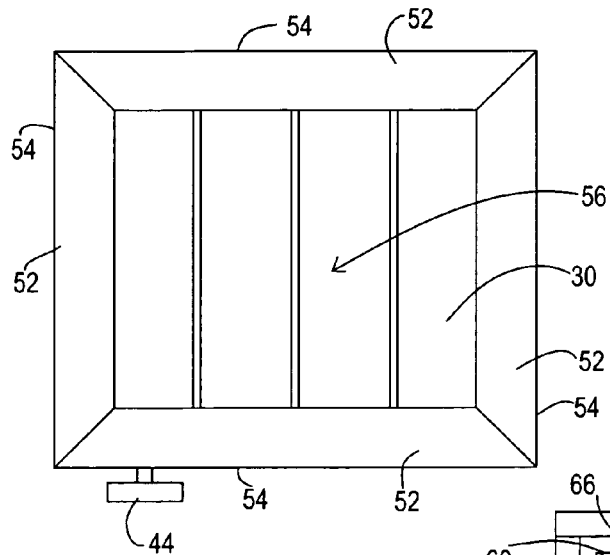
FIG. 3 shows a top view of a food product receptacle of the food product flavoring apparatus of FIG. 1.

Referring to FIG. 3 in connection with FIG. 1, FIG. 3 shows a top view of receptacle 22 of food product flavoring apparatus 20. Receptacle 22 includes inwardly tapered sides 52 surrounding a perimeter 54 of receptacle 22 that substantially enclose dispensing base. Tapered sides 52 facilitate the flow of plain popcorn 40 toward a central area 56 of dispensing base 30 when plain popcorn 40 is poured through central opening 42. Accordingly, less popcorn 40 settles about the perimeter of dispensing base 30.

Figure 4:
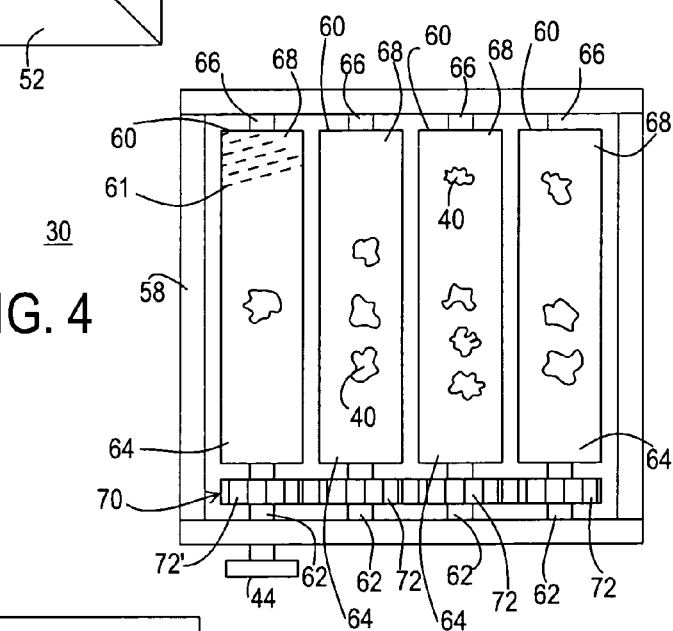
FIG. 4 shows a top view of a dispensing base of the food product receptacle of FIG. 3.

Referring to FIG. 4 in connection with FIG. 1, FIG. 4 shows a top view of dispensing base 30 of food product receptacle 22. Dispensing base 30 includes a frame 58 and moveable vanes 60. Vanes 60 have a non-stick surface 61 (generally represented by hash marks) configured for contact with plain popcorn 40. Non-stick surface 61 may be food safe polytetrafluoroethylene, also known by the brand name Teflon. Non-stick surface 61 advantageously provides stick resistance so that flavored popcorn 45 is better able to slide off of non-stick surface 61 when vanes 60 are adjusted to an open position (discussed below).

Like dispensing base 30, an inner surface (not shown) of hopper 32 also includes non-stick coating 61, thus providing hopper 32 with stick resistance so that flavored popcorn 45 is less likely to adhere to the sides of hopper 32 as flavored popcorn 45 drops from dispensing base 30.

Each of vanes 60 further includes a first spindle 62 extending from a first end 64 and a second spindle 66 extending from a second end 68 of a length of vane 60. First and second spindles 62 and 66 loosely fit in corresponding channels (not shown) in frame 58. Means, in the form of a gear system 70, is interconnected with first spindle 62 of each vane 60. The movement of gear system 70 is controlled by means of handle 44. In particular, handle 44 is coupled to one of gears 72 (in this case, the leftmost gear 72') of gear system 70 via the corresponding first spindle 62.

Figure 5:
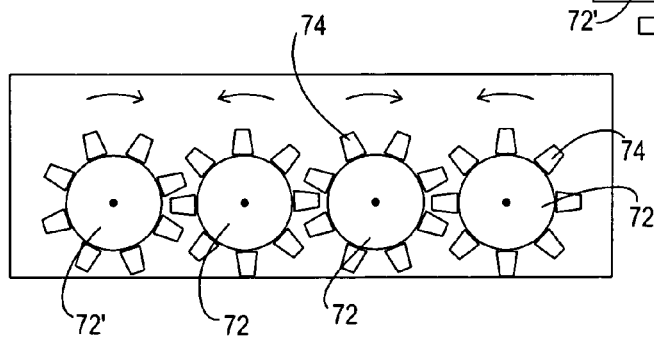
FIG. 5 shows a schematic view of a gear system utilized with the dispensing base of FIG. 4.

Referring to FIG. 5 in connection with FIGS. 1 and 4, FIG. 5 shows a schematic view of gear system 70 utilized with dispensing base 30. As shown, gears 72 have interlocking teeth 74. Accordingly, when handle 44 is rotated in a clockwise manner, leftmost gear 72' rotates clockwise, forcing adjacent gears 72 to move in opposing directions.

Figure 6:
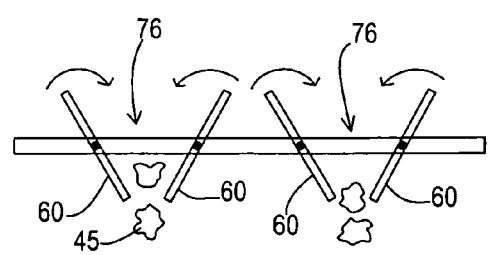
FIG. 6 shows a schematic view of vanes of the dispensing base adjusted to enable a food product to be dispensed through the dispensing base.

Referring now to FIG. 6 in connection with FIG. 5, FIG. 6 shows a schematic view of vanes 60 of dispensing base 30 adjusted to enable a food product, i.e., flavored popcorn 45, to be dispensed through dispensing base 30. The rotation of gears 72 results in commensurate movement of vanes 60 in opposing directions forming funneled openings 76 through which flavored popcorn 45 falls.

Although dispensing base 30 is shown having a gear system for adjusting vanes 60 to an open position, those skilled in the art will recognize that the present invention may be adapted to include other adjusting means. For example, vanes 60 could be opened and closed by way of a moving linkage system, by a chain drive system, by varying sized gears, and so forth. In addition, vanes 60 are manually opened and closed utilizing mechanical means, i.e., handle 44, for straightforward design, simplicity of operation, and durability. However, in an alternative embodiment, vanes 60 may be motor driven to an opened or a closed position.

Figure 7:
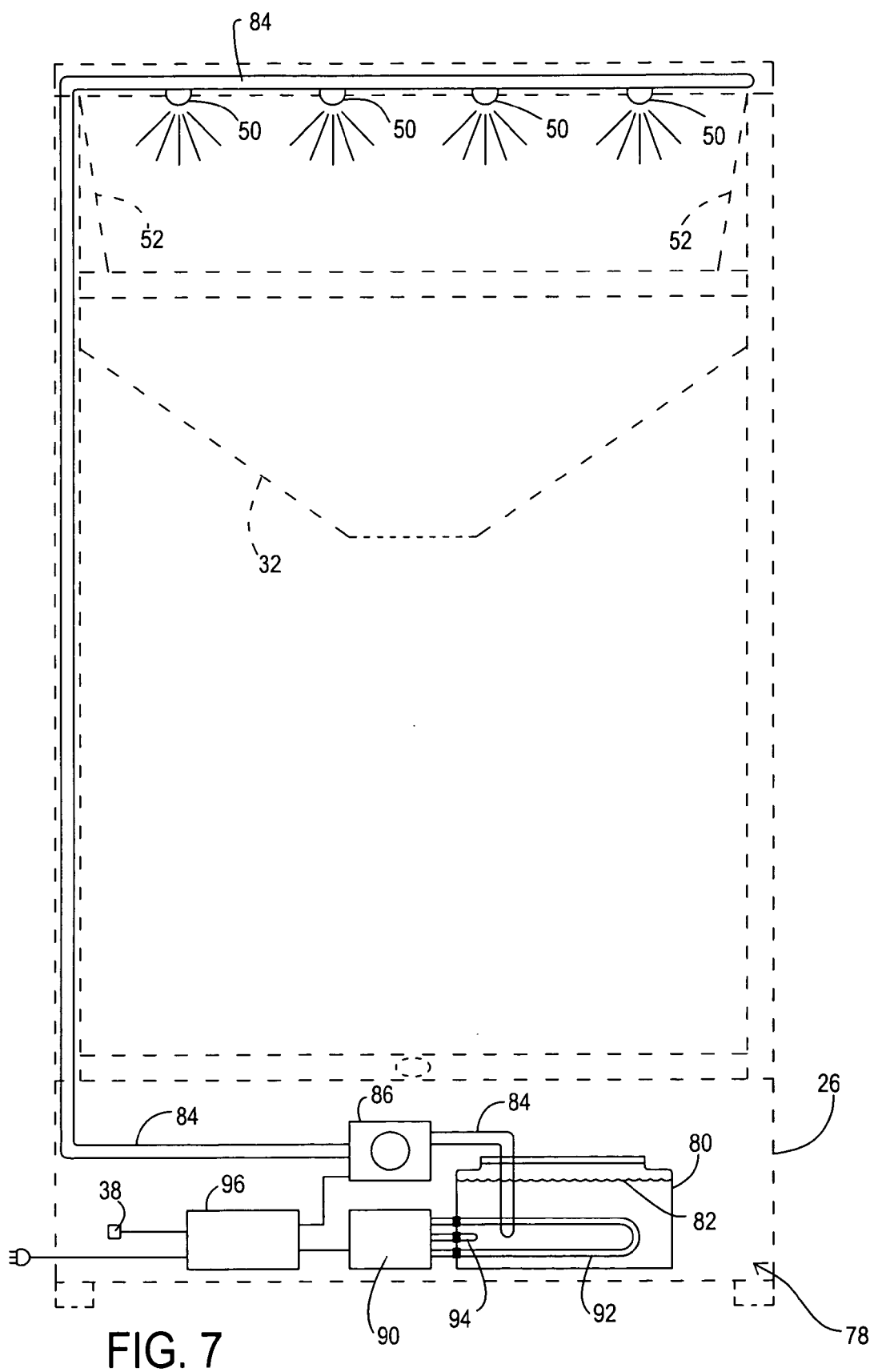
FIG. 7 shows a block diagram of a liquid flavoring delivery system installed within the food product flavoring apparatus (as shown in ghost form).

FIG. 7 shows a block diagram of a liquid flavoring delivery system 78 installed within the food product flavoring apparatus 20 (represented in ghost form). Liquid flavoring delivery system 78 is largely located in base 26 and is accessible when waste collection tray 46 is slid out from base 26. Liquid flavoring delivery system 78 includes a vessel 80 for holding a liquid flavoring 82. As mentioned above, liquid flavoring 82 may be butter, butter-flavored oil, or some other flavoring that may be applied to plain popcorn 40 (FIG. 1) in a liquid form. Means, in the form of a conduit 84 and a pump 86, are in communication with vessel 80. Conduit 84 is routed via the frame structure of apparatus 20 to nozzles 20.

A heater unit 90 includes a heating element 92 located in vessel 80 and controlled via a thermostat 94. Liquid flavoring 82 may be in a semi-solid, or thickened, form when placed in vessel 80. Heater unit 90 heats liquid flavoring to a desired temperature, for example, approximately one hundred sixty degrees, or within a desired temperature range, for example one hundred thirty to one hundred ninety degrees. Liquid flavoring 82 is desirably maintained at an elevated temperature for ease of flow through conduit 84 and non-clogging passage from nozzles 50. In addition, liquid flavoring 82 is maintained at an elevated temperature for enhanced palatability. That is, customers typically prefer a warmed butter topping on their popcorn as opposed to a cool butter topping.

A control circuit 96 is interconnected with dispensing button 38, pump 86, and heater unit 90. Control circuit 96 provides an interface between dispensing button 38 and pump 86. In addition, control circuit 96 manages power distribution and control for pump 86 and heater unit 90. When dispensing button 38 is activated, liquid flavoring 82 is drawn into an inlet 98 of conduit 84 that is residing in vessel 80. Liquid flavoring 82 is pumped upwardly through conduit 84 to nozzles 50. The pressure of liquid flavoring 82 and the configuration of nozzles 50 cause liquid flavoring 82 to spray from nozzles 50 in a substantially uniform manner to cover plain popcorn 40 (FIG. 1). Consequently, the desired effect is achieved of a mist-like spray of liquid flavoring over popcorn 40 in accordance with the desire of the customer.

In summary, the present invention teaches of a food product flavoring apparatus for applying liquid flavoring to a food product. In particular, multiple nozzles distributed above a dispensing base, upon which a plain food product sits, dispense a uniform mist of the liquid flavoring to the plain food product. A single pushbutton activation results in application of the liquid flavoring, and a simple turn of a handle releases the now treated food product into a customer's container. Accordingly, the apparatus is easily operated and can be utilized by a customer at a self-service station of a business establishment, such as at a movie theater. Through multiple activations of the dispensing button, or by activating the dispensing button for a desired amount of time, a patron can apply a desired quantity of liquid flavoring onto his or her own container of food product, such as popcorn. Misting the slippery liquid flavoring onto the food product in an enclosed receptacle significantly limits the amount of liquid flavoring that might fall to the floor, thus decreasing clean-up time and mitigating the hazard of spillage of such an oil-based product. The mist-like spray of liquid flavoring generally coats a large volume of popcorn, thus imparting the pleasing flavor onto each kernel with less waste than prior systems, and without making any one kernel excessively soggy.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A food product flavoring apparatus comprising:
   a receptacle having a dispensing base for selectively holding said food product, said dispensing base including moveable vanes;
   a nozzle positioned above said dispensing base;
   a vessel in fluid communication with said nozzle for holding a liquid flavoring;
   means in communication with said vessel for delivering said liquid flavoring to said nozzle and spraying said liquid flavoring from said nozzle to uniformly cover said food product; and
   means for adjusting said vanes to enable a release of said food product through said dispensing base.

2. An apparatus as claimed in claim 1 wherein said receptacle includes inwardly tapered sides adjoining said dispensing base.

3. An apparatus as claimed in claim 1 wherein said dispensing base has a non-stick surface configured for contact with said food product.

4. An apparatus as claimed in claim 1 wherein said dispensing base selectively releases said food product, and said apparatus further comprises a hopper positioned below said dispensing base for funneling said food product into a container when said food product is released from said dispensing base.

5. An apparatus as claimed in claim 4 wherein said hopper has a non-stick surface configured for contact with said food product.

6. An apparatus as claimed in claim 1 further comprising:
   a removable waste collection tray positioned below said dispensing base; and
   walls surrounding at least a portion of said dispensing base and said removable waste collection tray.

7. An apparatus as claimed in claim 1 further comprising a heater in heat-exchange relation with said vessel for maintaining said liquid flavoring in a liquid form.

8. An apparatus as claimed in claim 1 wherein said delivering means comprises:
   a pump connected with said nozzle; and
   a conduit interconnected between said vessel and said pump for carrying said liquid flavoring to said pump, said pump being operable to spray said liquid flavoring under pressure onto said food product.

9. An apparatus as claimed in claim 1 wherein said food product is popcorn, said liquid flavoring is a butter flavoring, and said apparatus is operable by a patron of a business establishment.

10. A food product flavoring apparatus comprising:
a receptacle having a dispensing base for selectively holding said food product, said dispensing base including moveable vanes;
multiple nozzles distributed above said dispensing base;
a vessel in fluid communication with said multiple nozzles for holding a liquid flavoring;
means in communication with said vessel for delivering said liquid flavoring to said multiple nozzles and spraying said liquid flavoring from said multiple nozzles, said multiple nozzles being configured to cause said liquid flavoring sprayed from said multiple nozzles to uniformly cover a surface area of said dispensing base; and
means for adjusting said vanes to enable a release of said food product through said dispensing base.

11. An apparatus as claimed in claim 10 wherein said receptacle includes inwardly tapered sides adjoining said dispensing base.

12. An apparatus as claimed in claim 10 wherein said vanes have a non-stick surface configured for contact with said food product.

13. An apparatus as claimed in claim 10 further comprising a heater in heat-exchange relation with said vessel for maintaining said liquid flavoring in a liquid form.

14. An apparatus as claimed in claim 10 wherein said delivering means comprises:
a pump connected with said multiple nozzles; and
a conduit interconnected between said vessel and said pump for carrying said liquid flavoring to said pump, said pump being operable to spray said liquid flavoring under pressure onto said food product.

* * * * *